United States Patent [19]

Watanabe et al.

[11] 4,275,425
[45] Jun. 23, 1981

[54] SYSTEM FOR AUTOMATICALLY TRANSFERRING INFORMATION MEDIA

[75] Inventors: Takeo Watanabe, Suita; Tadashi Kubota; Akio Yamagami, both of Katano, all of Japan

[73] Assignee: Matsushita Electric Industrial Co., Ltd., Osaka, Japan

[21] Appl. No.: 98,036

[22] Filed: Nov. 28, 1979

[30] Foreign Application Priority Data

Nov. 29, 1978 [JP] Japan .............................. 53-148369

[51] Int. Cl.³ ............................................ G11B 15/68
[52] U.S. Cl. ...................................................... 360/92
[58] Field of Search ......................................... 360/92

[56] References Cited

U.S. PATENT DOCUMENTS

| | | | |
|---|---|---|---|
| 3,854,004 | 12/1974 | Baumel et al. | 360/92 |
| 3,938,190 | 2/1976 | Semmlow et al. | 360/92 |
| 4,133,013 | 1/1979 | Fisher | 360/92 |

*Primary Examiner*—Robert S. Tupper

*Attorney, Agent, or Firm*—Joseph W. Farley

[57] ABSTRACT

A system comprising a tape stocker storing a plurality of tapes having recorded thereon sound or images and arranged in a vertical direction for delivering and receiving the tapes, a rack accommodating a plurality of reproduction units arranged at least in a horizontal direction and adapted to reproduce the sound or images recorded on the tapes, a tape handling assembly having a tape receiving head turnable and vertically movable toward or away from the reproduction units, the tape handling assembly being operable to handle the tapes for transferring the tapes between the stocker and the reproduction units in the rack, a carriage supporting the stocker and the taper handling assembly and horizontally movable along the rack, and a control unit for controlling the stocker, the tape handling assembly and the carriage to deliver a specified one of the tapes to the desired reproduction unit. Information media, such as video tapes, are retrieved and transferred by the system to the desired location for the reproduction of the recorded information.

3 Claims, 6 Drawing Figures

SYSTEM FOR AUTOMATICALLY TRANSFERRING INFORMATION MEDIA

The present invention relates to a system for automatically transferring information media, and more particularly to an automatic system by which information media, such as video tapes, can be retrieved and transferred to the desired location.

Great progress has been made in the development of terminal devices for reproducing visual images, such as video tape recorders, television monitors and video projectors. As an application of the advanced image reproduction techniques, it is desired, in the present-day information-oriented society, to provide a system for promptly retrieving the desired audio-visual information from a large quantity of various tapes stored in an educational, cultural, broadcasting or like facility for the reproduction of the information. Such a system will be useful, for example, as a language instruction system for selectively presenting informative images to a large number of students, or as a system for selectively giving various items of housekeeping information to those who are interested. The usefulness of systems of this type is not limited to individual facilities for educational, cultural, recreational or like information services; the systems will become more useful in the future for data transmission through telephone lines, optical fiber communication, multiplex broadcasting, CATV, still picture broadcasting, etc. With the development of new transmission systems and broadcasting systems, they will find very wide use for various purposes and applications in local societies as well as in nationwide broadcasting and communication networks.

The object of the present invention is to provide a system for automatically transferring information media which is useful for such a wide variety of applications.

With reference to the accompanying drawings, a preferred embodiment of the invention will be described below which is adapted to transfer a selected one of many tapes to the desired one of a plurality of video tape recorders.

Figure 1:
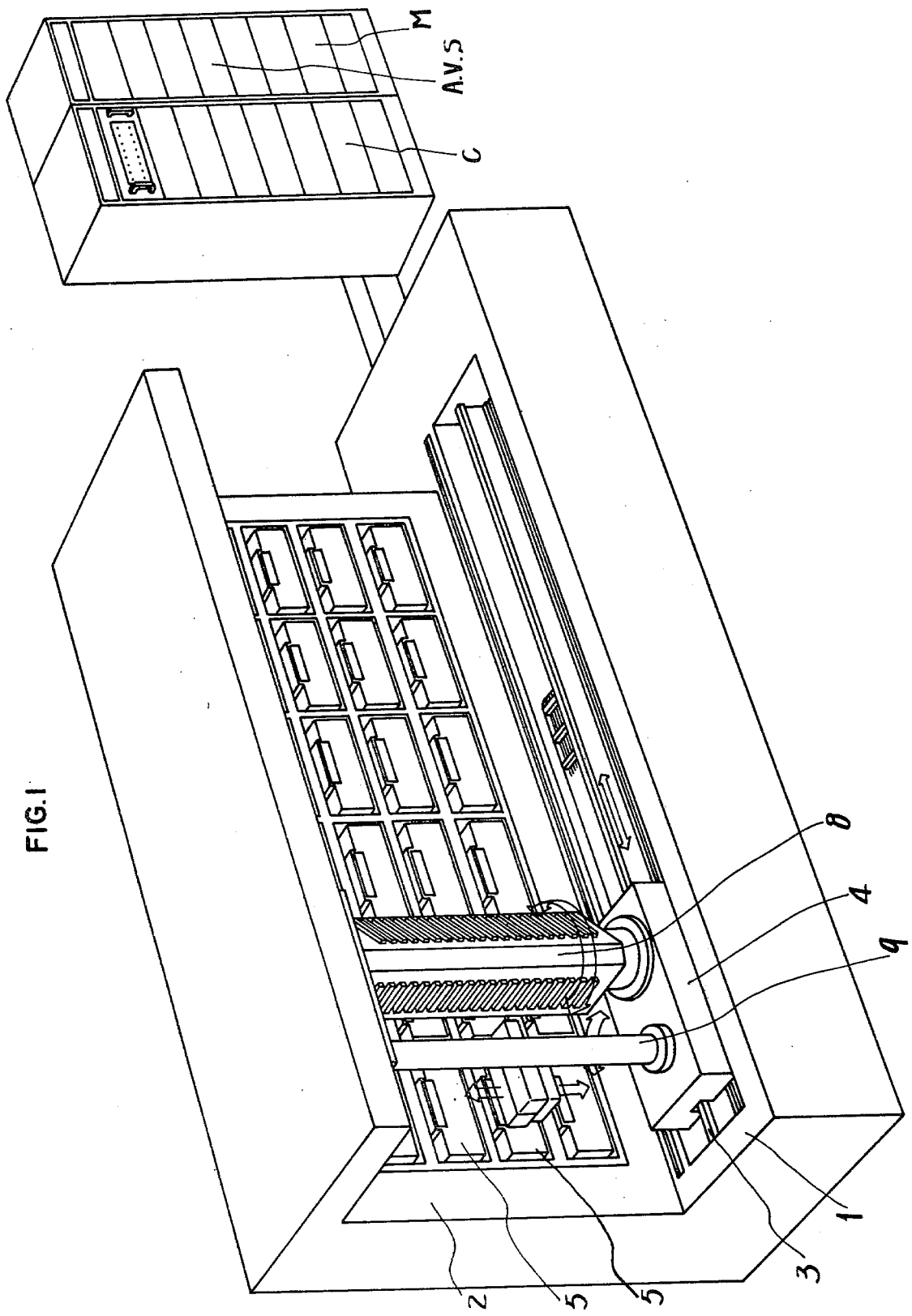
FIG. 1 is an overall perspective view showing a system embodying the invention for transferring information media.
Figure 2:
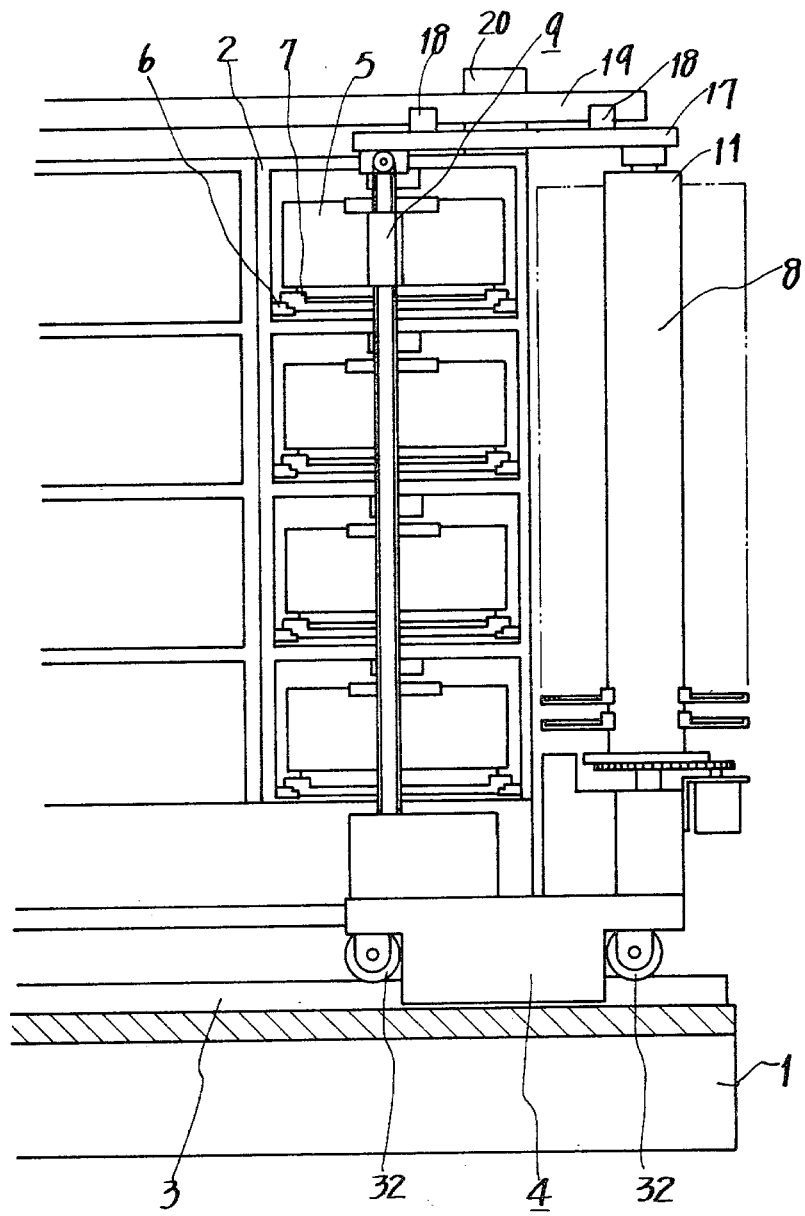
FIG. 2 is a fragmetary front view showing the system of FIG. 1 with its cover removed.
Figure 3:
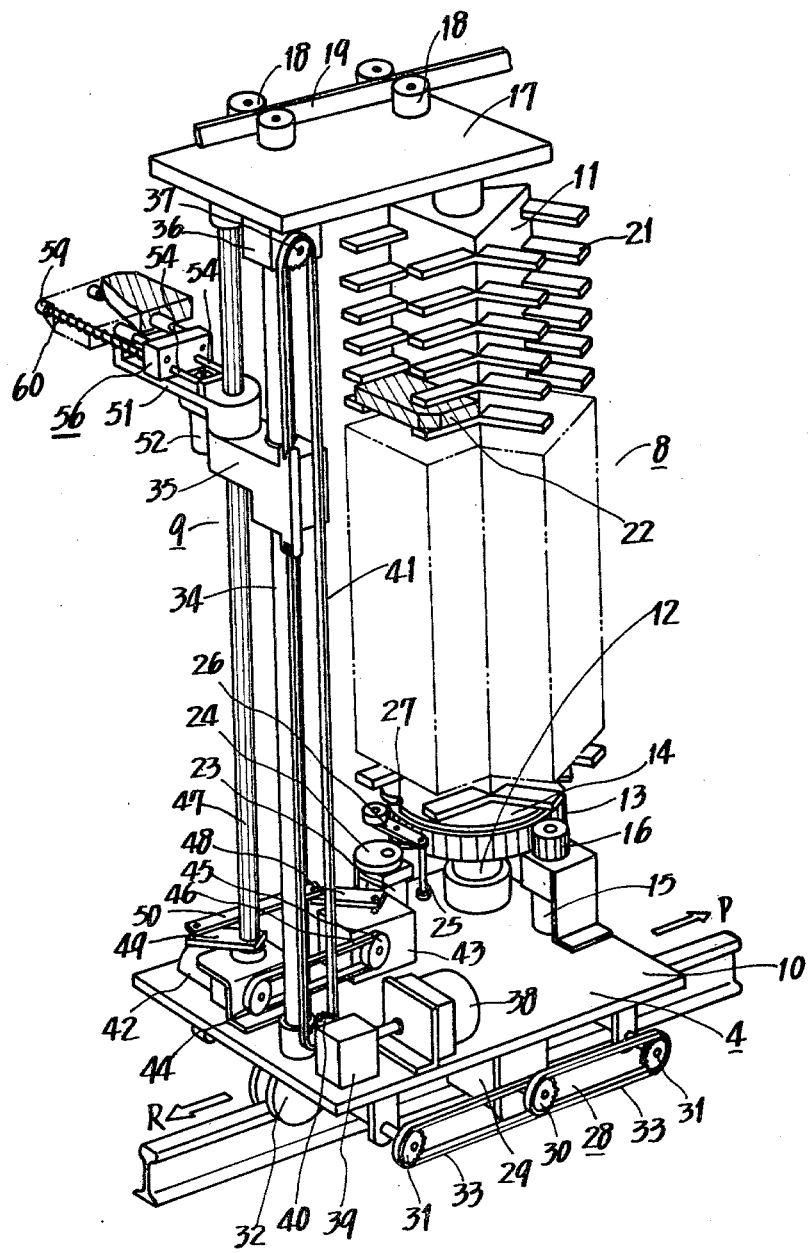
FIG. 3 is a perspective view of FIG. 2.
Figure 4:
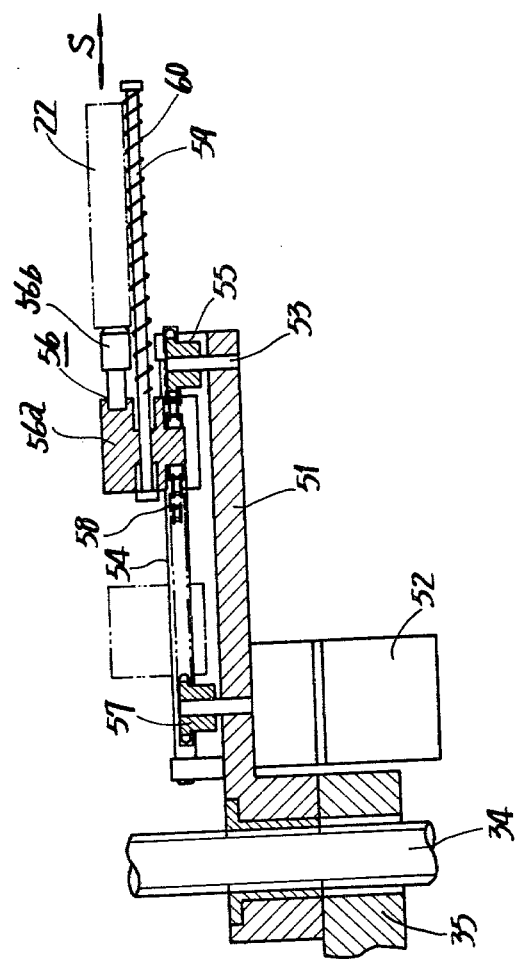
FIG. 4 is a fragmentary enlarged view in section showing a tape handling assembly.
Figure 5:
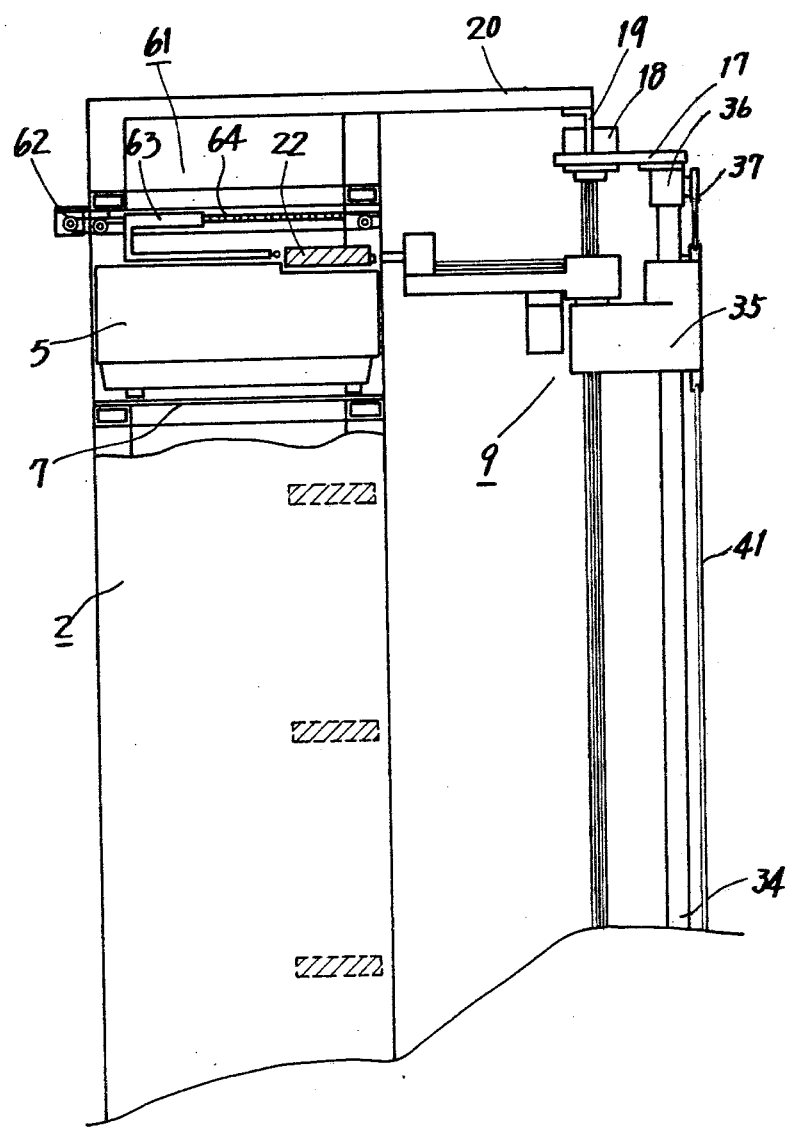
FIG. 5 is a fragmentary side elevation partly in section and showing a rack and the tape handling assembly.

With reference to FIGS. 1 to 3, a video tape recorder rack 2 and a rail 3 are mounted on a base 1. A tape carriage 4 is supported on the rail 3. The rack 2 has an open front side and divided interior spaces each accommodating a video tape recorder (VTR) 5 withdrawably. Each interior space of the VTR rack 2 is provided with guides 6 removably provided with a support 7 thereon. The VTR 5 is placed on the support 7.

The tape carriage 4 on the rail 3 is opposed to the VTR rack 2 and movable on the rail 3 alongside the rack. A tape stocker 8 and a tape handling assembly 9 are supported on the carriage 4, which comprises a movable frame 10. The frame 10 carrying the stocker 8 and tape handling assembly 9 is movable on the rail 3 along the rack 2. The tape stocker 8 has the following construction. A stocker drum 11 is rotatably mounted on a shaft 12 fixedly provided on the movable frame 10. A gear 13 and a positioning plate 14 are attached to the drum 11. A motor 15, mounted on the movable frame 10, has a pinion 16 fixed to its shaft and meshing with the gear 13. A block 17 supporting the upper end of the shaft 12 rotatably carries pairs of rollers 18 nipping a rail 19 therebetween. The rail 19 is fixed to arms 20 attached to upper portions of the VTR rack 2 and serve to retain the tape carriage 4 against inclination and to guide the carriage 4 for travel. A large number of supports 21 are provided on the outer periphery of the stocker drum 11 to support tapes 22. A positioning motor 23 mounted on the movable frame 10 has a shaft carrying a cam 24, which in turn is in contact with a positioning lever 26 turnably mounted on a post 25 extending upward from the movable frame 10. Accordingly the motor 23, when driven, rotates the cam 24, which turns the lever 26 on the post 25 and engages the lever 26 in one of three restraining grooves 27 formed in the positioning plate 14, whereby the stocker drum 11 is retained in position. Conversely when the lever 26 is disengaged from the grooved portion 27 of the plate 14 and the motor 15 is driven, the pinion 16 on the motor 16 rotates to drive the gear 13 meshing therewith, consequently driving the stocker drum 11 attached to the gear 13. Pairs of the aforementioned tape supports 21 for supporting the tapes 22 (e.g. video cassette, video cartriges or the like) thereon are provided on the stocker drum 11 in stages. The tape supports 21 are also arranged in pairs around the drum 11, namely circumferentially of the shaft 12.

Drive means 28 comprising the following members is provided at a lower portion of the movable frame 10. The frame 10 has on its under side a motor 29 for running the carriage 4 horizontally, with a drive sprocket 30 mounted on the motor 29. Driven sprockets 31 are attached to wheels 32 on the rail 3. A chain 33 is reeved around the drive sprocket 30 and each of the driven sprockets 31.

With the arrangement described above, the rotation of the motor 29 drives the wheels 32 through the drive sprocket 30, chains 33 and driven sprockets 31 to move the frame 10 in the direction of an arrow R or P.

The tape handling assembly 9 will now be described in detail. A slide rod 34 fixed to the movable frame 10 has a vertically movable slider 35 thereon and a block 36 at its upper end. The block 36 has a sprocket 37 rotatable thereon. Indicated at 38 is motor mounted on the movable frame 10, at 39 a reduction gear coupled to the motor 38, at 40 a sprocket mounted on the output shaft of the reduction gear 39, and at 41 a chain reeved around the sprockets 37 and 40. A portion of the chain 41 is secured to the slider 35. Thus the motor 38, when driven, drives the chain 41 and moves the slider 35 upward or downward. A motor 42 and a reduction gear 43 are also mounted on the movable frame 10. A belt 46 is reeved around a pulley 44 mounted on the shaft of the motor 42 and a pulley 45 on the reduction gear 43. A splined shaft 47 rotatably supported by the movable frame 10 and the block 17 extends through the slider 35 and is rotatable relative to the slider. A lever 48 secured to the output shaft of the reduction gear 43 is connected by a link 50 to a lever 49 fixed to the splined shaft 47.

The rotation of the motor 42 therefore rotates the splined shaft 47 by way of the reduction gear 43, lever 48, link 50 and lever 49. An arm 51 disposed on the slider 35 and meshing with the splined shaft 47 is vertically slidable and rotatable with the splined shaft 47. The arm 51 has a motor 52 and is fixedly provided with a sprocket shaft 53 and a pair of guide rods 54. A sprocket 55 is rotatably mounted on the shaft 53. A tape receiving head 56 has a main body block 56a slidably supported on the guide rods 54. A chain 58 is reeved around the sprocket 55 and a sprocket 57 on the shaft of the motor 52. A portion of the chain 58 is attached to the main body block 56a. Accordingly the motor 52, when rotated, drives the chain 58 and moves the block 56a on the guide rods 54. The main body block 56a is fixedly provided with pushing rods 56b and supports tape receiving rods 59 which are slidable in the direction of an arrow S and biased outward each by a spring 60.

The VTR rack 2 has tape delivering means 61 of the following construction. The divided interior space of the rack 2 is provided with a motor 62 and a tape pusher rod 63. The tape 22 placed in the VTR 5 is pushed out onto the tape receiving rods 59 by the pusher rod 63 which is driven by the rotation of the motor 62 through a chain 64. The VTR 5 is connected to an image recording camera TC or television monitors $T_1, T_2, T_3, \ldots T_n$ for the reproduction of the recorded images.

Figure 6:
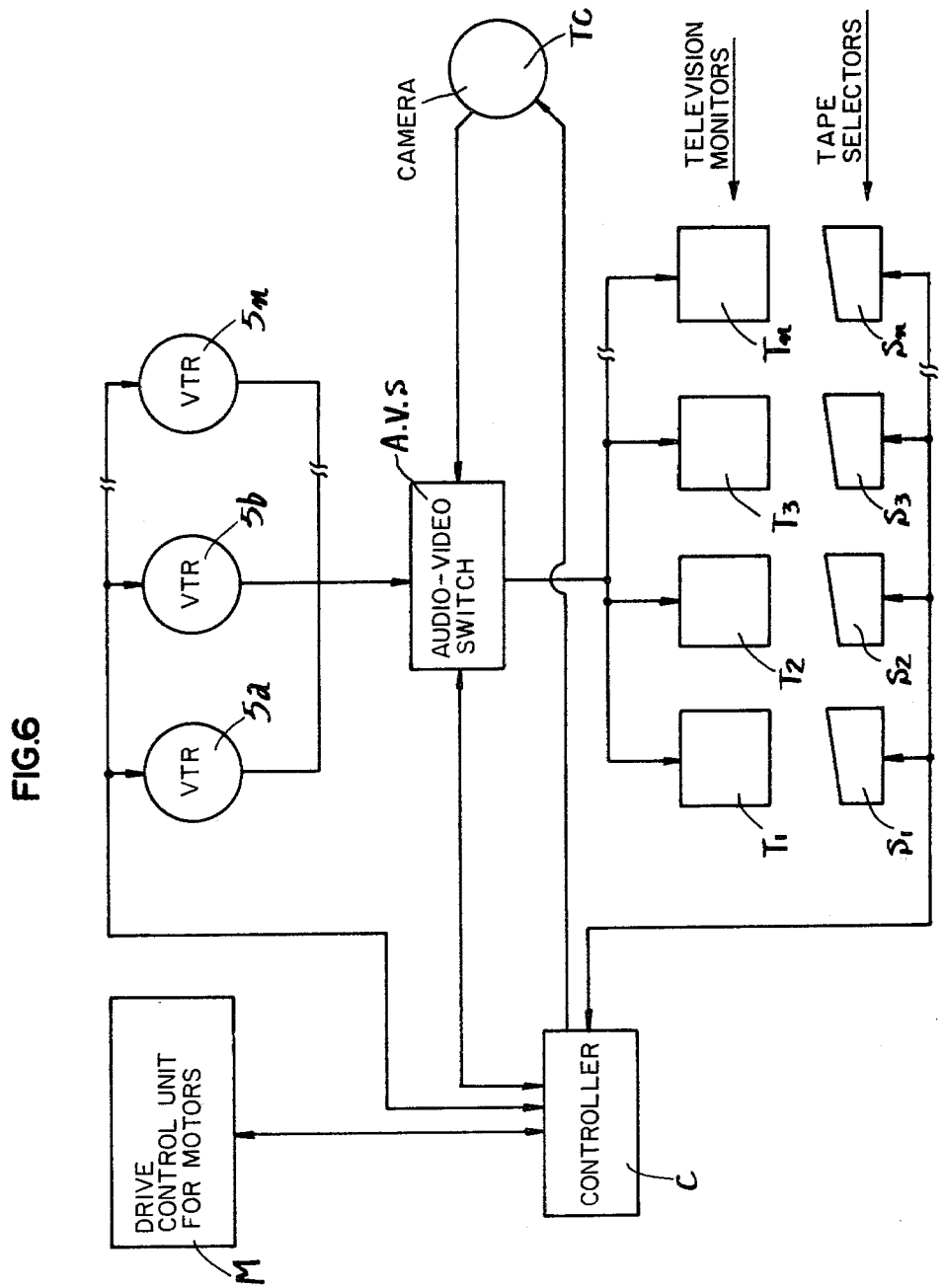
FIG. 6 is a block diagram showing a control system for the transfer system.

FIG. 6 shows a control system for the transfer system described above, comprising a drive control unit M for the motors 15, 23, 29, 38, 42, 52, etc., VTR's $5a, 5b, \ldots 5n$, corresponding to the VTR's 5 mentioned, an audio-video switch AVS, television monitors $T_1, T_2, T_3, \ldots T_n$, selectors $S_1, S_2, S_3, \ldots S_n$ for selecting the desired tape from a group of many tapes for the remote control of the VTR's 5, and a controller C which, in response to a signal from the selectors $S_1$ to $S_n$, controls the drive control unit M, selects one of the VTR's $5a$ to $5n$, controls the operation of the selected VTR and further controls the operation of the audio-video switch AVS.

With the system described above, the user selects the desired tape from among a large number of tapes by one of the selectors $S_1$ to $S_n$, whereupon the controller C functions to drive the motor 15 by a specified amount, bringing the stocker drum 11 to a predetermined position, where the drum is halted. The motor 23 then rotates to engage the positioning lever 26 in one of the grooved portions 27 of the positioning plate 14 attached to the drum 11, whereby the drum 11 is retained in position. The selected tape 22 is now opposed to the tape handling assembly 9.

The motor 38 then rotates to move the tape receiving rods 59 upward or downward to a position opposed to the selected tape 22.

Subsequently the motor 52 rotates, bringing the tape receiving rods 59 to a position below the selected tape 22. The motor 38 thereafter rotates by a small amount and slightly raises the rods 59, causing the rods 59 to support the tape 22 thereon. The subsequent rotation of the motor 52 withdraws the tape supporting rods 59 from the stocker 8. The motor 42 then rotates to turn the arm 51 and the rods 59 in a horizontal direction toward the VTR rack 2.

The motor 29 thereafter rotates to drive the tape carriage 4 in parallel with the VTR rack 2 and bring the carriage 4 to the location of the desired VTR 5 (one of $5_a$ to $5_n$). This is followed by the rotation of the motor 52, which places the tape receiving head 56 into that VTR 5. At this time, the selected tape 22 is inserted into the VTR 5 by being pushed by the pushing rod 56b.

Subsequently the VTR 5 operates to record images on the tape 22 or reproduce the images recorded thereon.

On completion of the recording or reproduction, the motor 62 rotates, causing the tape pusher rod 63 to push out the tape 22 from the VTR 5 and place the tape onto the receiving rods 59 again. The tape receiving rods 59 thereafter move in an order and a direction exactly opposite to the tape feeding movement to return the tape 22 to the original position in the stocker 8.

Thus the desired information can be retrieved from various items of taped information and reproduced readily and smoothly by the system of this invention despite its compact construction. The system is therefore useful for language laboratories, automatic reproduction of taped music, etc.

When the reproduction units are arranged also one above another in a plurality of stages, the system is usable for a large number of users at the same time for the reproduction of individually required items of information. Further if the tape stocker is rotatable on a vertical shaft and has a circular periphery for storing tapes therearound, an increased number of tapes, namely, an increased amount of information can be stored in the stocker. Thus the present system has an immense commercial value.

What is claimed is:

1. In a system for automatically transferring information media, the improvement comprising:
   a stocker accomodating a plurality of information media as arranged in a vertical direction for delivering and receiving the media;
   a rack accomodating a plurality of reproduction units arranged at least in a horizontal direction and adapted to reproduce the information recorded on the media;
   handling means having an information media receiving head turnable and vertically movable and movable toward or away from the stocker and the reproduction units, for transferring the media between the stocker and the reproduction units in the rack; and
   carriage means supporting the stocker and the handling means and horizontally movable to bring the receiving head to a position opposed to any one of the reproduction units in the rack.

2. A system as defined in claim 1 wherein the rack has accommodated therein the reproduction units as arranged one above another in a plurality of stages.

3. A system as defined in claim 1 or 2 wherein the stocker is in the form of a column rotatable on a vertical shaft and storing the media around its outer periphery.

* * * * *